(12) United States Patent
Wright

(10) Patent No.: US 6,243,984 B1
(45) Date of Patent: Jun. 12, 2001

(54) ROOT DEFLECTOR

(76) Inventor: Paul Kevin Wright, 53 Marriott Road Pakuranga, Auckland (NZ)

( * ) Notice: Subject to any disclaimer, the term of this patent is extended or adjusted under 35 U.S.C. 154(b) by 0 days.

(21) Appl. No.: 09/443,138

(22) Filed: Nov. 19, 1999

(30) Foreign Application Priority Data

Nov. 20, 1998 (GB) .................................................. 9825542

(51) Int. Cl.$^7$ .................................................. A01G 17/00
(52) U.S. Cl. .................................................. 47/25
(58) Field of Search .................................. 47/23, 25, 32, 47/78

(56) References Cited

U.S. PATENT DOCUMENTS

| | | | |
|---|---|---|---|
| 4,019,279 | * | 4/1977 | Moorman et al. ........................ 47/25 |
| 4,584,789 | * | 4/1986 | Jean et al. ................................ 47/25 |
| 4,995,191 | * | 2/1991 | Davis ........................................ 47/25 |
| 5,402,602 | * | 4/1995 | Huang ....................................... 47/78 |
| 5,647,169 | * | 7/1997 | Bui ............................................ 47/78 |

* cited by examiner

*Primary Examiner*—Charles T. Jordan
*Assistant Examiner*—Francis T. Palo
(74) *Attorney, Agent, or Firm*—Young & Thompson

(57) ABSTRACT

The root deflector has a split collar for installation around a root ball. The collar has a peripheral skirt for location beneath ground level which skirt has on its interior face guide faces on internal projections which direct root growth impinging thereon downwardly. The ends of the collar at the split line may be secured together by a snap engaging clip and the collar has a shoulder for location at ground level and over which a lawn mower may run for cutting grass adjacent to the collar. The collar may be formed of molded plastics.

16 Claims, 3 Drawing Sheets

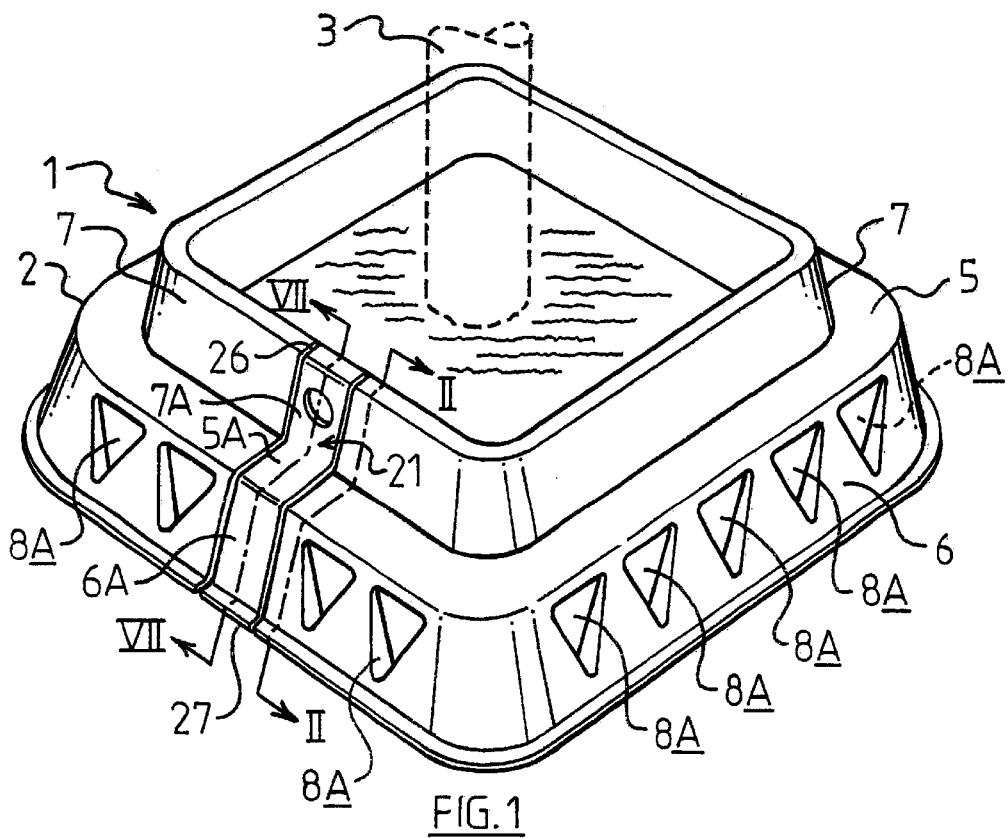
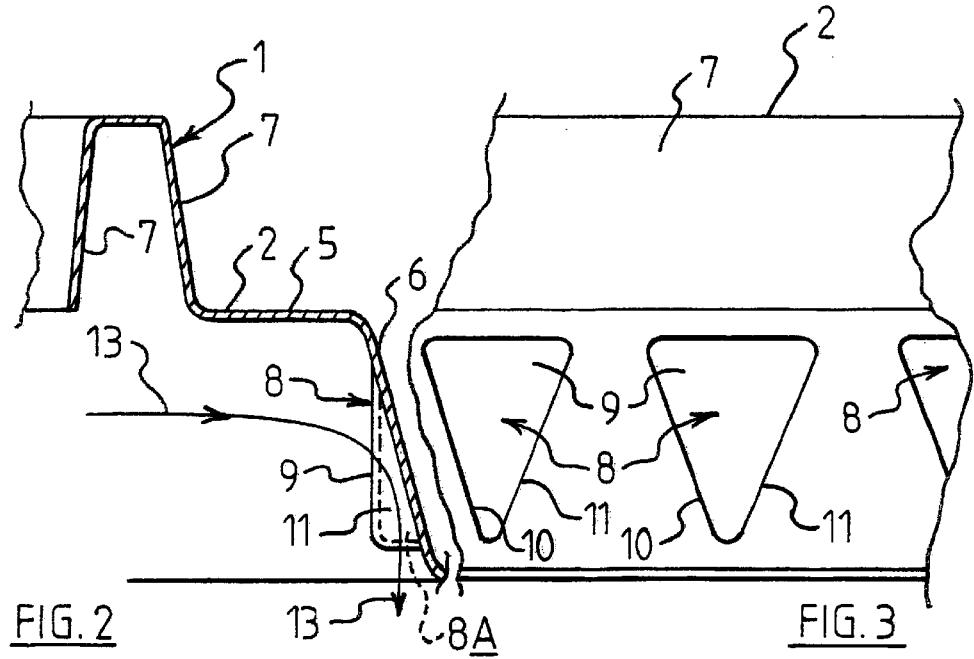

ROOT DEFLECTOR

TECHNICAL FIELD AND BACKGROUND ART

The present invention relates to a root deflector of a kind having a collar which is intended to be installed in a horizontal plane around the root ball of a tree, shrub, bush or other plant to restrict sideways growth of the roots and to deflect the root growth in a downward direction.

Root deflectors of the kind aforementioned are well known, usually being formed as plastics mouldings and being utilised to direct root growth away from regions where, for example, such growth could cause structural damage as lifting or cracking of paving stones and the like or be generally undesirable or inconvenient in a cultivated plot. Examples of known root deflectors are disclosed in Patent Specifications U.S. Pat. No. 5,070,642 and WO 94/00002.

A problem which has been encountered with previously proposed root deflectors is that the root growth tends to be directed as a spiralling formation in a horizontal plane within the bounds of the deflector. As a consequence ground penetration by the roots tends to be retarded and may be inadequate to sustain growth of the tree or bush and to anchor the tree or bush in the ground (as compared with what may be considered reasonable for the expected root growth) It is an object of the present invention to provide a root deflector which alleviates the aforementioned disadvantages and which is of a relatively simple construction capable of economic manufacture, particularly when such manufacture is by plastics moulding.

STATEMENT OF INVENTION AND ADVANTAGES

According to the present invention, there is provided a root deflector comprising a collar for installation in a substantially horizontal plane around a root ball for the tree, bush or other plant to project upwardly through the collar, said collar having a downwardly extending peripheral skirt for location beneath ground level and wherein said skirt has on its interior face a plurality of peripherally spaced guide faces which are inclined relative to the vertical for directing root growth impinging thereon downwardly relative to the deflector when installed.

The peripherally spaced guide faces in the deflector of the present invention serve to direct the roots downwardly as such roots abut and move over the guide faces during their growth. Preferably the collar is clear of protuberancies which could hinder root growth beneath the guide faces. Typically the guide faces will be flat and inclined at approximately 30° to the vertical when the collar is installed in a horizontal plane. The parts of the collar on which the guide faces are presented should not themselves form obstructions to root deflection and growth in a downward direction; with this in mind it is preferred that the skirt has a peripherally spaced array of buttress type projections directed inwardly of the skirt and the guide faces are presented by inclined side faces on these projections. With such buttress type projections, it is possible to ensure that the guide faces are presented in a manner which alleviates the formation of shoulders or rebates on the interior of the skirt which could deflect the roots in a direction other than downwardly.

Preferably the collar is formed as a plastics moulding. The aforementioned buttress type projections are preferably hollow to present correspondingly shaped recesses on the exterior of the skirt. Such hollow projections are particularly advantageous for conserving use of plastics material in the moulding of the deflector.

Preferably the skirt diverges outwardly in the downward direction so that the divergence of the interior of the skirt itself serves to deflect root growth in a downward direction.

The profile presented by the collar in plan may be or any shape but usually will be rectangular, circular or oval. The collar may be formed as a one-piece peripherally continuous structure so that it is necessary either to locate the collar over a tree or shrub or to locate a tree or shrub through the collar during installation. Preferably, however, the collar has a split line which permits it to be opened, usually by flexure of plastics from which it is preferably formed, for installation of the deflector around the trunk or other growth from an existing buried root ball. With such a split collar, means will usually be provided for securing together opposite ends of the collar at the split line following its installation. This securing means may be presented by interengaging end parts of the collar such as studs on one end of the collar snap engaging in apertures at the opposite end of the collar. Preferably, however, the securing means is in the form of a clip which is engageable with opposite ends of the collar to bridge the split line. Such a clip may be snap engageable with the collar and profiled to be accommodated unobtrusively in an aesthetically pleasing manner within rebates at the ends of the collar adjacent to the split line.

DRAWINGS

One embodiment of a root deflector constructed in accordance with the present invention will now be described, by way of example only, with reference to the accompanying illustrative drawings in which;

FIG. 1 is a perspective view of the deflector;

FIG. 2 is a scrap section of the collar of the deflector taken on the line II—II of FIG. 1;

FIG. 3 is a view of part of the interior of the collar of the deflector as presented to root growth;

DETAILED DESCRIPTION OF DRAWINGS

Figure 4:
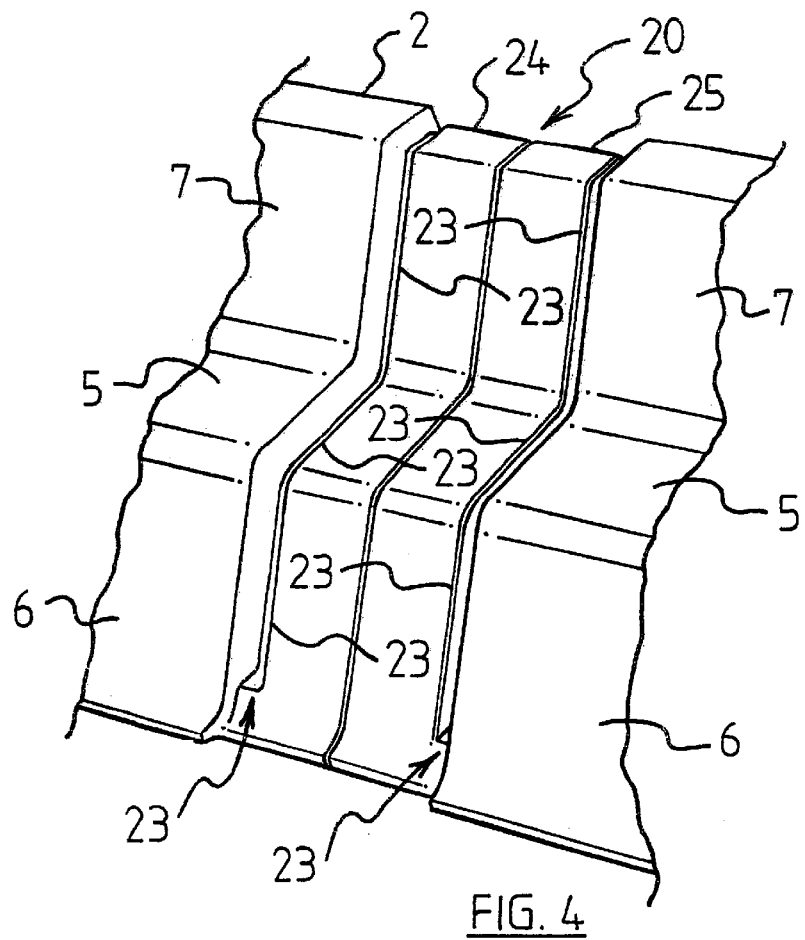
FIG. 4 is a perspective view of part of the collar illustrating a split line along which the collar may be opened for its installation.

The root deflector (1) shown in FIG. 1 has a collar (2), the peripheral profile of which in plan is generally rectangular. The collar is formed in plastics, preferably by rotational or injection moulding, typically in polypropylene or polyethylene. In use, the collar (2) will be installed by partly burying it in soil so that it extends around the root ball of, typically, a tree indicated at (3), the trunk of which extends through the collar whilst the collar is generally horizontal. The collar (2) is of a stepped formation to provide a substantially flat, peripherally extending and upwardly directed external shoulder (5) downwardly from which extends a peripheral skirt (6) and upwardly from which extends a peripheral wall (7). For structural stability and aesthetics, the upwardly extending wall (7) is of a cavity structure as shown in the section of FIG. 2. The skirt (6) diverges outwardly or is flared as it recedes from the shoulder (5), that is in the downward direction and again this is best seen from FIG. 2, In use, the deflector (1) will usually be installed so that the skirt 16) is buried in soil up to the level of the flat shoulder (5) which is preferably level with the ground surface whilst the wall (7) extends upwardly from the ground surface, This latter arrangement is convenient, for example when the deflector is installed in a lawn so that a lawn mower may be run along the shoulder (5) to cut grass closely alongside the deflector. The upstanding wall (7) may usefully retain, for example barkchips, provide a chamber for watering the root and also a barrier to protect the tree/plant (3) during strimming.

Moulded into the skirt (6) on the interior face of that skirt is a peripherally spaced array of buttress-like projections (8). These projections (8) are hollow so that correspondingly shaped recesses (8A) are presented on the exterior of the skirt (6) as shown in FIG. 1. The use of such hollow projections (8) is particularly advantageous for moulding of the collar as conserving plastics material. The projections (8) have flat front faces (9) of generally triangular profile. Each projection (8) has a lowermost apex upwardly from which extend side faces (10 and 11) (see FIG. 3) which form a V-shape on the interior of the skirt (6). These side faces (10 and 11) present downwardly directed guide faces for deflecting root growth from the tree (3) and when the deflector is installed horizontally, each flat guide face (10,11) is inclined at approximately 300 to the vertical as shown in FIG. 3. From FIG. 2, it will be seen that because each projection (8) has a flat vertical front face (9) which extends upwardly to join the interior face of the flared skirt (6), the width of each guide face (10,11) tapers to nothing in the upwardly direction.

With root growth outwardly from the tree (3) in the direction indicated by arrow (13) in FIG. 2, such roots impinging on the guide faces (10,11) will be deflected downwardly of the collar and such downward deflection will also result from engagement of the roots with the flared skirt (6). Abutment of roots with the flat front face (9) of the projections (8) may cause root growth to be deflected or diverted in multiple directions but it is likely that much of the growth resulting from this diversion will eventually impinge on a guide face (10 or 11) to be deflected downwardly. Such minor proportion of root growth as may be deflected upwardly or inwardly to spiral within the collar is unlikely to have an appreciable adverse affect either on the growth of the tree or the stability with which the tree is anchored in the ground by its root.

In addition to the aforementioned advantage of conserving plastics material in the moulding of the collar (2), the recesses (8A) on the exterior of the skirt which are presented by the formation of the hollow projections (8) have the advantage that when the skirt is buried in soil as previously mentioned, the soil will fill the recesses (8A) to restrain the deflector from being lifted out of the ground either accidentally or as a result of pressure from the root growth.

Figure 5:
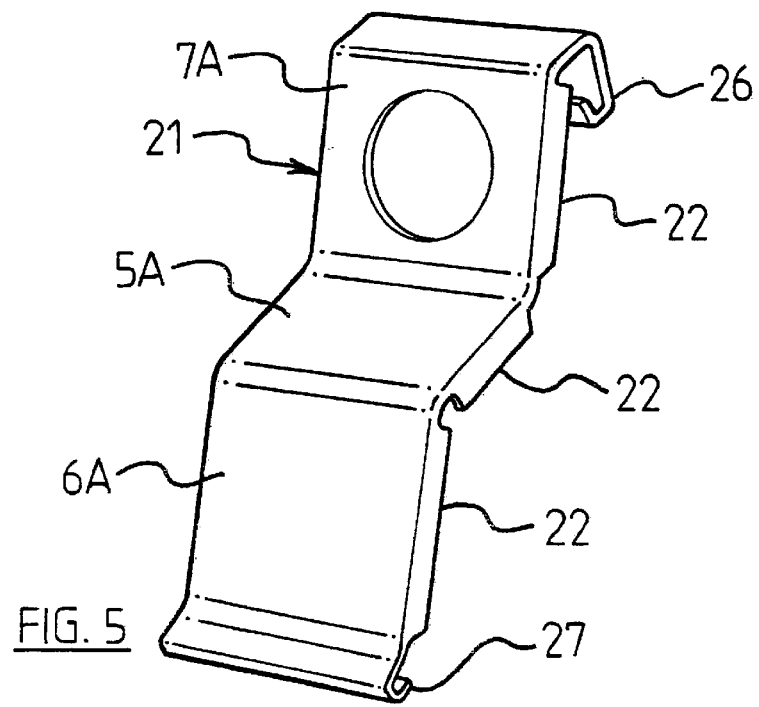
FIG. 5 is a perspective view of a clip which is to be fitted to the collar over the split line.
Figure 6:
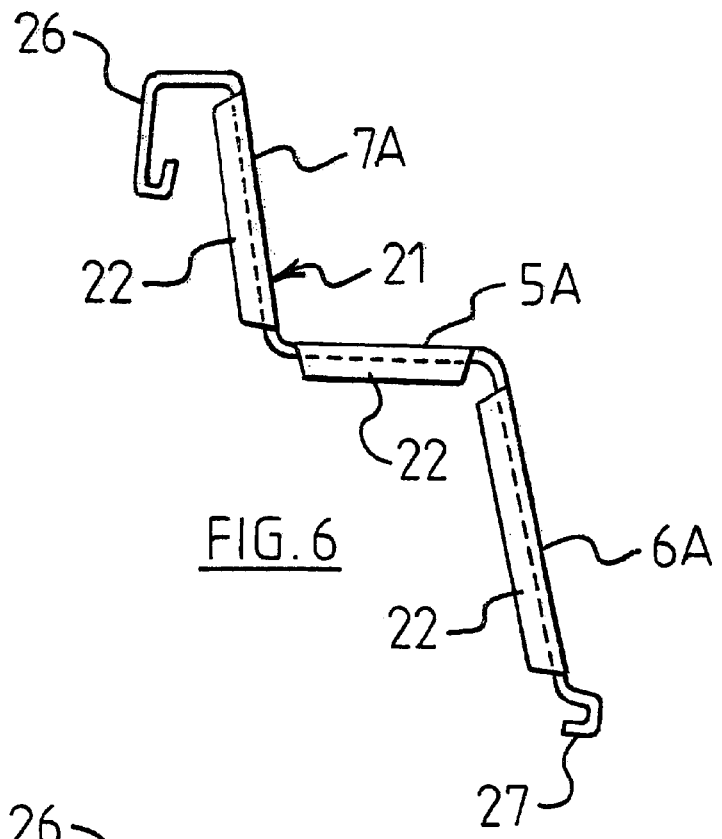
FIG. 6 is a side view of the clip in FIG. 5.
Figure 7:
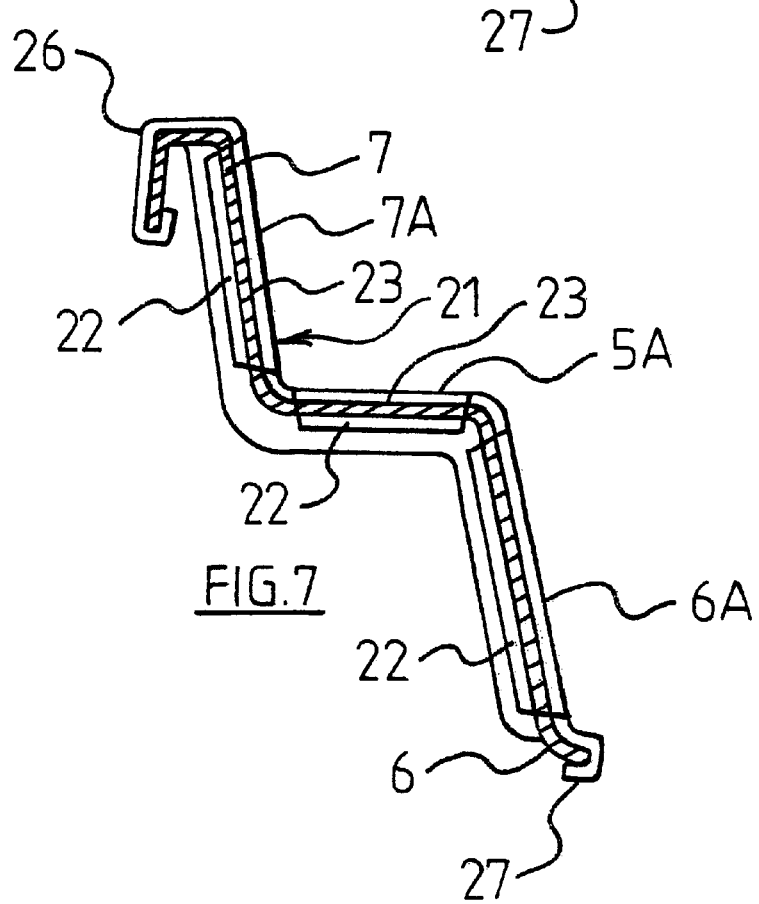
FIG. 7 is a scrap section generally along the line VII—VII of FIG. 1 showing the clip secured to the collar to bridge the split line.

For convenience of installing the root deflector (1), the collar (2) is provided with a split line (20) so that it is peripherally discontinuous (see FIG. 4). The collar (2) may be opened out at its split line by flexure of the plastics thereby permitting the trunk of the tree (3) to pass through the opening at the split line to install the collar around the root ball without disturbing the root within the soil. Following installation of the split collar (2), the ends of the collar adjacent to the split line (20) are secured together by use of a plastics moulded clip (21) (FIG. 5). The clip (21) is intended to bridge the split line (20) on the exterior side of the collar (2) and has tongues or similar projections (22) which engage in the slots or similar complementary apertures (23) in the ends of the collar (2) adjacent to the split line (20) to restrain the collar from being opened along its split line. It will be seen from FIG. 4 that marginal ends (24 and 25) of the collar (2) adjacent to the split line (20) are rebated on the exterior of the collar to follow the profile presented by the exterior of the wall (7), shoulder (5) and skirt (6). It will also be seen from FIGS. 5 and 6 that the clip (21) is of dogleg profile as indicated at 5A, 6A and 7A to correspond with the external profile presented by the wall (7), shoulder (5) and skirt (6). Furthermore, the clip (21) is sited and profiled to be accommodated as a close complementary fit within the profile presented by the rebated collar ends (24 and 25) so that the clip, when fitted to the collar, is unobtrusive on the exterior of the collar. As the clip (21) is fitted to the collar to bridge the split line (20), the tongues (22) are received within the respective slots (23) to prevent the collar from opening at its split line. The clip (21) is provided at its upper and lower ends with hooks (26 and 27), respectively. These hooks are arranged so that during initial fitting of the clip to the collar, the hook (26) is engaged over the wall (7), or more particularly over the inner part of that cavity wall which may be shortened locally to permit its engagement by the hook (26) as shown in FIG. 7. With the hook (26) engaged, the clip (21) is lowered onto the rebated ends (24 and 25) to locate the tongues (22) in their respective slots (23). Finally the bottom hook (27) is snap engaged over the lower edge of the skirt (6) within the rebated ends (24 and 25) to firmly secure the clip to the collar as shown in FIG. 7. The clip (21) when fitted is substantially unobtrusive on the exterior of the collar (2) and may present an aesthetically pleasing feature in the design of the collar as shown in FIG. 1.

What is claimed is:

1. A root deflector comprising:
   a collar for installation in a substantially horizontal plane around a root ball of a tree, bush or other plant to project upwardly through said collar, said collar having a downwardly extending peripheral skirt for location beneath ground level; and
   a plurality of peripherally spaced guide faces on the interior face of said skirt, said guide faces being inclined relative to the vertical for directing root growth impinging thereon downwardly relative to the deflector when installed,
   wherein said collar is stepped to provide a peripheral, external and upwardly directed shoulder from which shoulder said skirt extends downwardly and a peripheral wall extends upwardly.

2. The deflector as claimed in claim 1, wherein said collar has a split line which permits it to be opened for installation around an existing buried root ball.

3. The deflector as claimed in claim 2 and further comprising means for securing together opposite ends of said collar adjacent to said split line following installation of said collar.

4. The deflector as claimed in claim 3, wherein said securing means comprises a clip engageable with said ends of said collar to bridge said split line.

5. The deflector as claimed in claim 4, wherein said clip is snap engageable with said collar to be secured thereto.

6. The deflector as claimed in claim 4, further comprising cooperating projections and apertures between said clip and said collar to restrain said collar from opening on said split line.

7. The deflector as claimed in claim 4, wherein marginal ends of said collar adjacent to said split line are rebated to accommodate said clip substantially unobtrusively on the exterior of said collar.

8. The deflector as claimed in claim 7, wherein said split line extends in a substantially vertical plane and said clip is dog-legged to correspond with the stepped profile of said collar.

9. The deflector as claimed in claim 1, wherein said collar is formed of moulded plastics.

10. A root deflector comprising:

a collar for installation in a substantially horizontal plane around a root ball of a tree, bush or other plant to project upwardly through the collar, said collar having a downwardly extending peripheral skirt for location beneath ground level; and a plurality of peripherally spaced guide faces on the interior face of said skirt, said guide faces being inclined relative to the vertical for directing root growth impinging thereon downwardly relative to the deflector when installed, wherein said skirt has on its interior face a peripherally spaced array of buttress projections directed inwardly of said skirt and said guide faces comprise inclined side faces of said projections and said projections being hollow to present correspondingly shaped recesses on the exterior of said skirt.

11. The deflector as claimed in claim 10, wherein said skirt diverges outwardly in the downward direction.

12. The deflector as claimed in claim 10, wherein said collar is formed of moulded plastics.

13. A root deflector comprising:

a collar for installation in a substantially horizontal plane around a root ball of a tree, bush or other plant to project upwardly through the collar, said collar having a downwardly extending peripheral skirt for location beneath ground level; and a plurality of peripherally spaced guide faces on the interior face of said skirt, said guide faces being inclined relative to the vertical for directing root growth impinging thereon downwardly relative to the deflector when installed, wherein said skirt has on its interior face a peripherally spaced array of buttress projections directed inwardly of said skirt and said projections having front faces of substantially V-shape and side edge faces presented by said V-shape comprise said guide faces.

14. The deflector as claimed in claim 13, wherein said projections are hollow to present correspondingly shaped recesses on the exterior of said skirt.

15. The deflector as claimed in claim 13, wherein said skirt diverges outwardly in the downward direction.

16. The deflector as claimed in claim 13, wherein said collar is formed of moulded plastics.

* * * * *